United States Patent
Liao

(10) Patent No.: US 11,403,860 B1
(45) Date of Patent: Aug. 2, 2022

(54) MULTI-SENSOR OBJECT DETECTION FUSION SYSTEM AND METHOD USING POINT CLOUD PROJECTION

(71) Applicant: Ming Liao, Whittier, CA (US)

(72) Inventor: Ming Liao, Whittier, CA (US)

(73) Assignee: ECOTRON CORPORATION, Whittier, CA (US)

(*) Notice: Subject to any disclaimer, the term of this patent is extended or adjusted under 35 U.S.C. 154(b) by 0 days.

(21) Appl. No.: 17/714,657

(22) Filed: Apr. 6, 2022

(51) Int. Cl.
*G06V 20/64* (2022.01)
*G06T 7/80* (2017.01)
*G06T 7/10* (2017.01)

(52) U.S. Cl.
CPC ............... *G06V 20/64* (2022.01); *G06T 7/10* (2017.01); *G06T 7/80* (2017.01); *G06T 2207/10028* (2013.01); *G06T 2207/20221* (2013.01)

(58) Field of Classification Search
CPC ........... G06V 20/64; G06T 7/10; G06T 7/80; G06T 2207/10028; G06T 2207/20221
See application file for complete search history.

(56) References Cited

U.S. PATENT DOCUMENTS

| 2016/0086052 | A1* | 3/2016 | Piekniewski | G06V 10/50 382/103 |
| 2017/0139417 | A1* | 5/2017 | Reiff | G05D 1/021 |
| 2019/0147610 | A1* | 5/2019 | Frossard | G06V 20/58 382/103 |
| 2020/0160559 | A1* | 5/2020 | Urtasun | G06K 9/629 |
| 2020/0174130 | A1* | 6/2020 | Banerjee | G01S 17/89 |
| 2020/0301013 | A1* | 9/2020 | Banerjee | G01S 13/867 |
| 2021/0232871 | A1* | 7/2021 | Iancu | G06V 10/56 |

OTHER PUBLICATIONS

Han, Jian "Target Fusion Detection of LiDAR and Camera Based on the Improved YOLO Algorithm" Mathematics 2018. (Year: 2018).*

* cited by examiner

*Primary Examiner* — Emily C Terrell
*Assistant Examiner* — Molly Wilburn
(74) *Attorney, Agent, or Firm* — Cohen IP Law Group, PC; Michael N. Cohen

(57) ABSTRACT

A system and method of multi-sensor object detection using point cloud projection is provided. The system uses a LiDAR system and a monocular camera to obtain point cloud data and image data of an object, respectively. A 3D bounding box is determined for the point cloud data and a 2D bounding box is determined for the image data. The LiDAR and camera are jointly calibrated, and the 3D object bounding box of the point cloud data is mapped to the corresponding 2D object bounding box of the image data. The system performs decision-level fusion on the point cloud data and the image data followed by a pixel-level fusion of the 3D object bounding box and the 2D object bounding box.

6 Claims, 8 Drawing Sheets

US 11,403,860 B1

MULTI-SENSOR OBJECT DETECTION FUSION SYSTEM AND METHOD USING POINT CLOUD PROJECTION

FIELD OF THE INVENTION

The present invention belongs to the field of sensor fusion, including fusion for multi-sensor object detection based on cloud point projection.

BACKGROUND

Autonomous vehicles utilize multiple sensors to recognize and classify objects in the vehicle's path. Most systems typically utilize both light detection and ranging (LiDAR) systems and monocular camera systems. The LiDAR systems are used to acquire accurate physical positions of the objects while the camera systems are used to recognize and classify the objects.

Sensor fusion is the process of combining sensor data (e.g., from a LiDAR system and a camera system) such that the resulting information has less uncertainty than would be possible when the sensors were used individually. This results in a more accurate model by balancing the strengths and weaknesses of each type of sensor system.

There are currently three main types of fusion, namely, pixel-level fusion, feature-level fusion, and decision-level fusion.

During actual applications of unmanned vehicles, it is necessary to consider the overall accuracy and timeliness of a system. With regard to the pixel-level fusion, most methods are implemented with early data fusion by performing early fusion on original data of the two sensor systems. However, due to sparsity of point clouds, one-to-one data fusion is difficult to implement between pixel points and coordinate values of the LiDAR, and computing resources are highly demanding, thereby reducing the timeliness of the system.

In response to describing consistencies of different objects, multiple sensors determine the overall consistencies of the objects with a distance threshold method to accelerate the overall running speed of the system. However, this technique may cause an association error of the objects in some scenarios.

Accordingly, there is a need to provide a fusion method for multi-sensor objection detection based on point cloud projection.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF EXEMPLARY EMBODIMENTS

In general, the system according to exemplary embodiments hereof provides a system and method of multi-sensor object detection fusion using cloud point projection.

In some embodiments, the system and method may be applied to the technical field and practical application of autonomous vehicle sensor systems.

Figure 1:
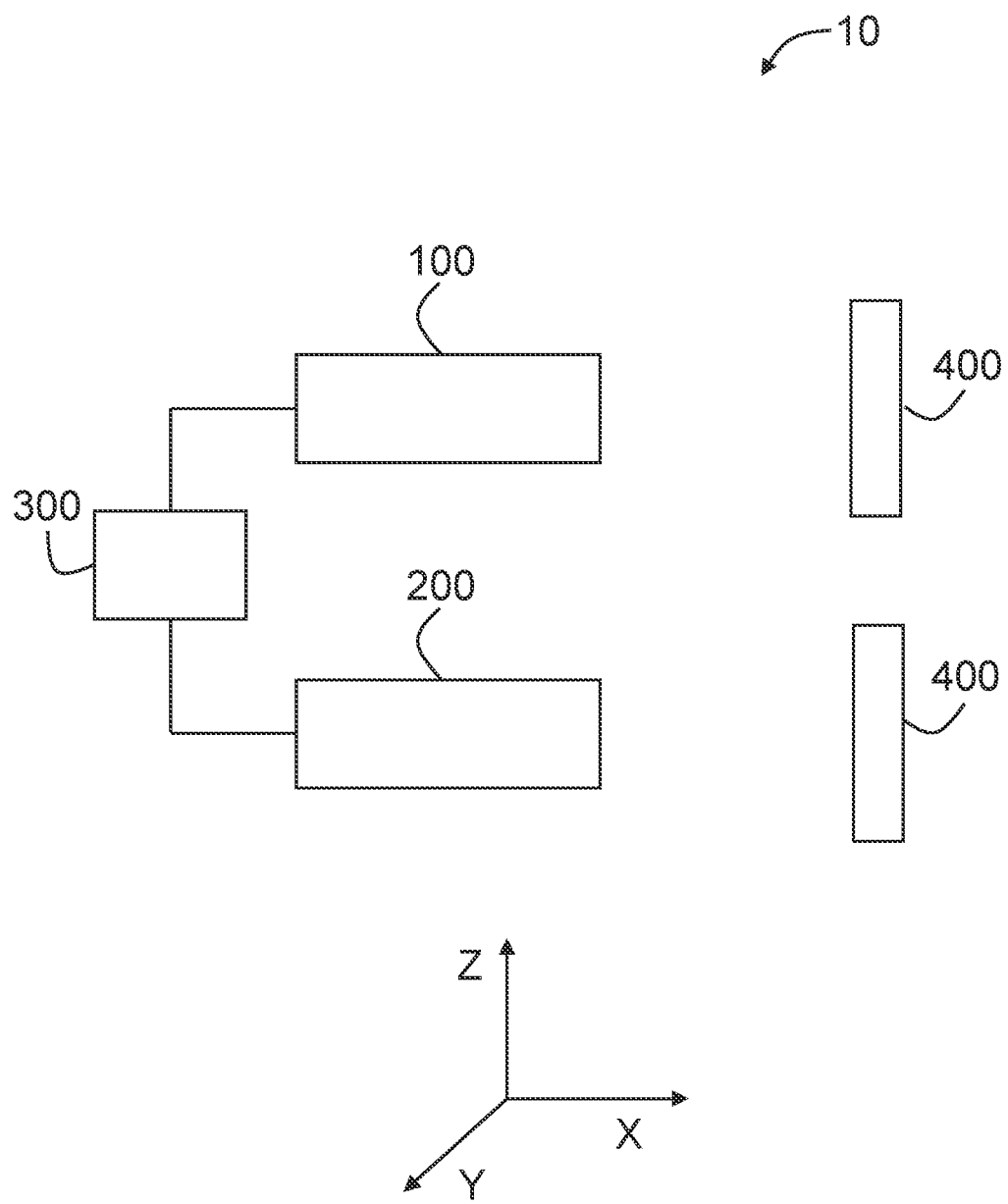
FIG. 1 shows an overview of a multi-sensor object detection fusion system in accordance with exemplary embodiments hereof.

FIG. 1 shows an overview of the multi-sensor object detection fusion system and method using point cloud projection 10 (also referred to herein as simply the system 10) according to exemplary embodiments hereof. As shown, the system 10 includes a LiDAR assembly 100, a camera assembly 200, and a controller 300. In general, the controller 300 controls the LiDAR assembly 100 and the camera assembly 200 during the calibration of the assemblies 100, 200 and during use of the system 10. The system 10 also may include one or more calibration boards 400 for use during calibration. The system 10 may include other elements and components as necessary for the system 10 to perform its functionalities as described herein.

Note that the assemblies 100, 200, 300, 400 shown in FIG. 1 are represented as simple blocks to demonstrate the general relationship between the assemblies 100, 200, 300, 400, and that FIG. 1 does not represent the exact sizes, locations, orientations and/or other characteristics of the assemblies 100, 200, 300, 400.

Figure 2:
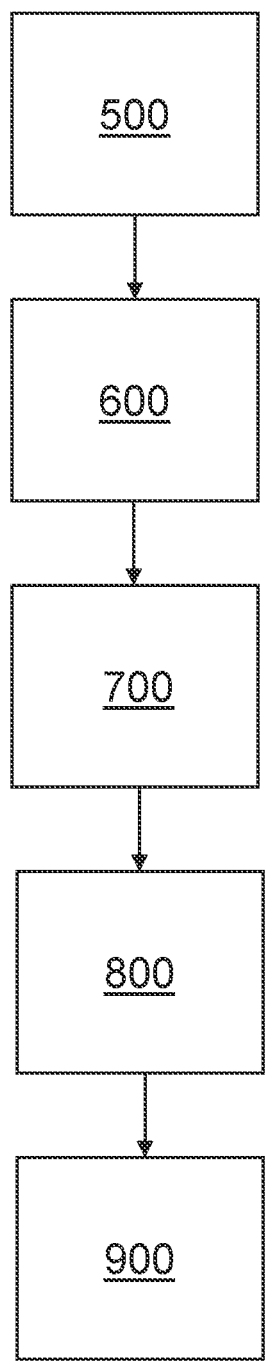
FIGS. 2-7 show actions taken by the multi-sensor object detection fusion system of FIG. 1 in accordance with exemplary embodiments hereof.

In some embodiments as shown in FIG. 2, the system 10 implements a sensor fusion method between the LiDAR assembly 100 and the camera assembly 200 in an overall five-step process.

In the first step at 500, according to some embodiments, the system 10 (i) calibrates the internal parameters of the camera assembly 200 (e.g., a monocular camera) using a calibration target (e.g., a chessboard calibration target), (ii) performs a joint calibration using the calibrated internal parameters of the camera assembly 200 from (i) and the LiDAR assembly 100, and (iii) outputs a calibrated external parameter matrix. The output calibrated external matrix describes the transformation relationship between the camera assembly 200 and the LiDAR assembly 100, and in particular, between the coordinate system of the camera assembly 200 and the coordinate system of the LiDAR assembly 100.

In a second step at 600, according to some embodiments, the system 10 acquires point cloud data using the LiDAR assembly 100 and image data using the camera assembly 200 of one or more objects. It is preferable that the point cloud data and the image data of the one or more objects are taken from the same angle of view (AOV). In doing so, the system 10 detects the one or more objects using the LiDAR assembly 100 and/or the camera assembly 200. The system 10 then classifies the one or more objects using the point cloud data and/or the image data. The system 10 may utilize an object detection algorithm (e.g., a deep learning-based object detection algorithm) as known in the art and/or any suitable solution.

In a third step at 700, according to some embodiments, the system 10 processes the point cloud data to obtain a LiDAR 3D object bounding box, and the image data to obtain a camera 2D object bounding box. Details of this will be described in other sections. (Note that an object bounding box also may be referred to as an object detection box.)

In a fourth step at 800, according to some embodiments, the system 10 transforms a coordinate system using the external parameter matrix output from 500, maps the corresponding 3D object bounding box of the point cloud data (from 700) to the corresponding 2D object bounding box of the image data (from 700), and performs decision-level fusion on the one or more objects detected by each of the LiDAR 100 and the monocular camera 200. This results in a consistent description of the LiDAR 100 and the monocular camera 200 on a same object. Details of this will be described in other sections.

In a fifth step at 900, according to some embodiments, the system 10 performs pixel-level fusion on the 3D object bounding box and on the 2D object bounding box utilizing the output from 800, thereby implementing channel augmentation of the point cloud data. Details of this will be described in other sections.

It is understood that the steps 500, 600, 700, 800, 900 are shown for demonstration and that other actions also may be taken. It also is understood that not all of the actions described must be taken and that the actions may be performed in different order(s).

Figure 3:
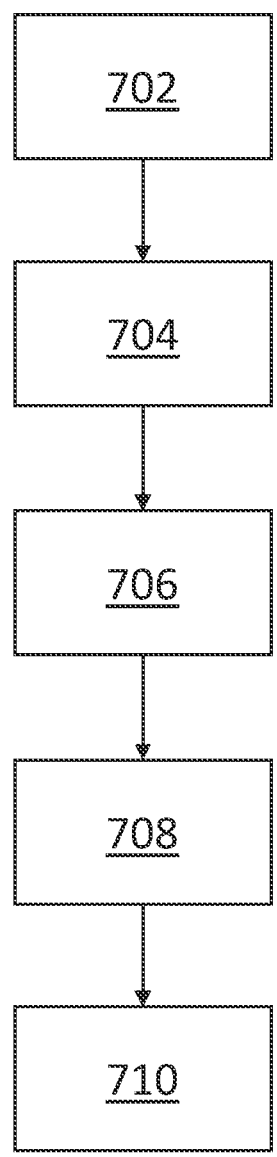

FIG. 3 refers to actions that the system 10 may take to complete step 700 of FIG. 2. Specifically, in some embodiments, to improve accuracy and/or to accelerate the calculation speed of the system 10, the point cloud data acquired by the LiDAR 100 is processed as follows.

First, at 702, the system 10 analyzes, with protocol content, an original data frame obtained by the LiDAR 100. In one example, the original data received by the LiDAR assembly 100 may comprise data frames, with each data frame including a data frame header, data content, and content verification bit(s). In some embodiments, the resolution of the protocol is typically analyzed by the LiDAR manufacturer. The manufacturer may provide the drive for LiDAR data analysis, often referred to as the drive package. After connecting the LiDAR 100 and the controller 300 and setting the IP address, and turning on the LiDAR and drive package, the data information in the protocol frame may be parsed into point cloud data and then converted into a desired date type, e.g., sensor_msgs data type.

Next, at 704, the system 10 crops out outlying point cloud data according to an AOV of the camera assembly 200.

Next, at 706, the system 10 filters the remaining point cloud data (e.g., to reduce noise) using a pseudo-scan line filter algorithm (or other suitable method).

Then, at 708, the system 10 down-samples the point cloud data using a voxel grid filter with a barycentric being a centroid of point cloud data in a voxel grid, and a barycenter coordinate being an average of all points in the voxel grid. The barycenter coordinate may be represented using the following equation:

$$\begin{cases} x = \frac{1}{M}\sum_{i=1}^{M} x_i \\ y = \frac{1}{M}\sum_{i=1}^{M} y_i \\ z = \frac{1}{M}\sum_{i=1}^{M} z_i \end{cases}$$

where:

M=a number of points in the point cloud data; and $x_i$, $y_i$, and $z_i$ represent a coordinate value on each of corresponding X-axis, Y-axis, and Z-axis in each piece of point cloud data.

In some embodiments, the point cloud data is sampled with the barycentric coordinate for representing all points in the voxel grid, effectively removing the ground point, and improving the detection accuracy of the object(s) (e.g., during object perception of an unmanned vehicle). That is, in the process of extracting the information of the object, the pseudo-scan line filter algorithm is used to filter the ground point leaving only the non-ground point in the point cloud data retained. This may improve the subsequent clustering accuracy of the non-ground point.

Next, at 710, the system 10 (i) segments the point cloud data at a non-ground point, (ii) clusters the point cloud data of an object with an adaptive threshold Euclidean clustering algorithm, and (iii) outputs the corresponding 3D object bounding box of the object.

It is understood that the steps 702, 704, 706, 708, 710 are shown for demonstration and that other actions also may be taken. It also is understood that not all of the actions described must be taken and that the actions may be performed in different order(s).

Figure 4:
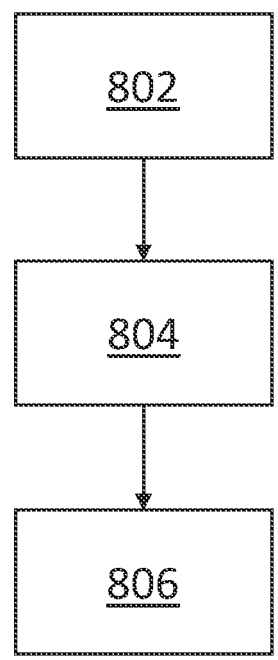

FIG. 4 refers to actions that the system 10 may take to complete step 800 of FIG. 2.

First, at 802, the system 10 processes the 3D object bounding box resulting from 700 by projecting, according to the external parameter matrix determined in 500, the 3D object bounding box to a pixel coordinate system where the 2D object bounding box is located. The system 10 then acquires, in the pixel coordinate system, corresponding corner coordinate(s) and a center coordinate of the 2D object detection box output in 700. Additional information regarding these actions will be described in other sections.

Next, at 804, the system 10 calculates a corresponding transformation relationship between a point cloud coordinate at which the 3D object bounding box is projected to the pixel coordinate system and an image coordinate of the 2D object detection box in the pixel coordinate system. In some embodiments, the output of the 2D target detection box includes a rectangular detection box. The output of each detection box includes a center position of the target X, Y, the width and height of the detection target, and the category information label of the detection target. In some embodiments, the LiDAR point cloud is processed through original data analysis, LiDAR data preprocessing and point cloud segmentation. The target after clustering preferably includes a 3D point cloud group. The 3D point cloud points are then transformed into the camera coordinate system through the external parameter transformation matrix determined at 500. At this point, the transformation from 3D point cloud data to 2D pixel points in the camera coordinate system may be completed.

Next, in some embodiments, the internal parameter matrix of the camera 200 is used to operate the transformation from 2D pixels in the camera coordinate system to 2D pixels in the camera pixel coordinate system. The point cloud data transformed into the pixel coordinate system determines the rectangular area according to its size in the u and v directions in the pixel coordinate system. Next, the central coordinates and length and width of the rectangular area may be calculated followed by the calculation of the data relationship between the detection box and the image detection box.

Then, at 806, the system 10 associates a transformed point cloud object bounding box to the image object bounding box using a discriminant method, thereby implementing the decision-level fusion on the point cloud data and the image data.

It is understood that the steps 802, 804, 806 are shown for demonstration and that other actions also may be taken. It also is understood that not all of the actions described must be taken and that the actions may be performed in different order(s).

Figure 5:
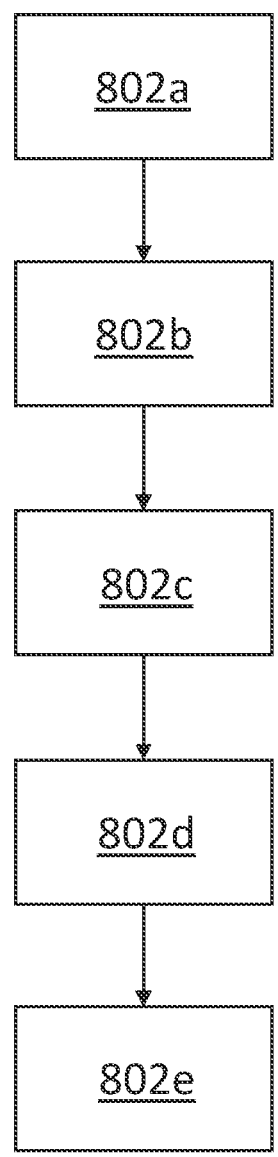

FIG. 5 refers to actions that the system 10 may take to complete step 802 of FIG. 2.

First, at 802a, the system 10 processes the point cloud data in the 3D object bounding box detected by the LiDAR 100 and calculates a maximum value and a minimum value of the point cloud data in the 3D object bounding box, including a corresponding maximum value and minimum value of the point cloud data on each of the X-axis, Y-axis, and Z-axis.

Next, at 802b, the system 10 calculate a centroid coordinate of the point cloud data in the 3D object bounding box (e.g., given that the point cloud data may be distributed disorderly).

Then, at 802c, the system 10 (i) calculates a scale of each corresponding X-axis, Y-axis and Z-axis for the point cloud data in the 3D object bounding box, (ii) determines a boundary of the point cloud data in each of the X-axis, Y-axis and Z-axis directions, and (iii) calculates, according to the centroid coordinate of the point cloud data and the scale of each of the corresponding X-axis, Y-axis and Z-axis, a start coordinate and an end coordinate of the point cloud data in each 3D object bounding box on each corresponding X-axis, Y-axis and Z-axis In this way, calculating the coordinates at the boundary of the point cloud data accelerates the calculation speed while improving the preprocessing of invalid points in the point cloud data.

Next, at 802d, the system 10 aligns time between the point cloud data and the image data.

In some embodiments, this begins with a spatial alignment. The implementation of spatial alignment is performed by calibrating the internal parameters of the monocular camera 200 to obtain the internal parameter matrix of the camera 200. Using the internal parameter file of the camera 200 and the LiDAR 100, the corresponding points may be identified. Next, a PNP algorithm may be used to calculate the external parameter transform matrix of the corresponding points. The consistency description of space target between the camera 200 and the LiDAR 100 may then be achieved by the external parameter matrix and the internal parameter matrix.

In some embodiments, the TF monitoring of ROS is adopted for implementation of time alignment, in which the sample frequency of the camera 200 is 30 Hz and that of LiDAR 100 is 10 Hz. In some embodiments, two methods of time alignment may be used, namely, (i) timestamp complete synchronization and (ii) adjacent frame alignment. In some embodiments, because the sample frequency of the LiDAR 100 and the camera 200 is relatively high, the system 10 may determine the adjacent frames of the two sensors 100, 200 through TF monitor to achieve the time alignment of the two sensors 100, 200.

Then, at 802e, the system 10 transforms, using the external parameter matrix from the joint calibration in 500, a point cloud coordinate system for point cloud data determined at the boundary in each of the X-axis, Y-axis and Z-axis directions. This includes transforming a point cloud data coordinate from a LiDAR coordinate system to a camera coordinate system and transforming the point cloud coordinate from the camera coordinate system to the pixel coordinate system through internal parameter information of the monocular camera 200. For example, the system 10 may transform a point cloud data coordinate in the 3D object bounding box to a 2D pixel coordinate in the pixel coordinate system, using the following transformation equation:

$$\begin{cases} u_x = \dfrac{cloudpoint_x * f_x}{cloudpoint_z} + c_x \\ v_y = \dfrac{cloudpoint_y * f_y}{cloudpoint_z} + c_y \end{cases}$$

where:
$u_x$, $v_y$ each represent coordinate data of transformed point cloud data in the image pixel coordinate system,
cloudpoint is a determined boundary point cloudpoint of the point cloud data in the 3D bounding box;
$f_x$, $f_y$ each are a focal length of the monocular camera 200; and
$c_x$, $c_y$ each are a photocenter coordinate of the monocular camera 200.

It is understood that the steps 802a-802e are shown for demonstration and that other actions also may be taken. It also is understood that not all of the actions described must be taken and that the actions may be performed in different order(s).

Figure 6:
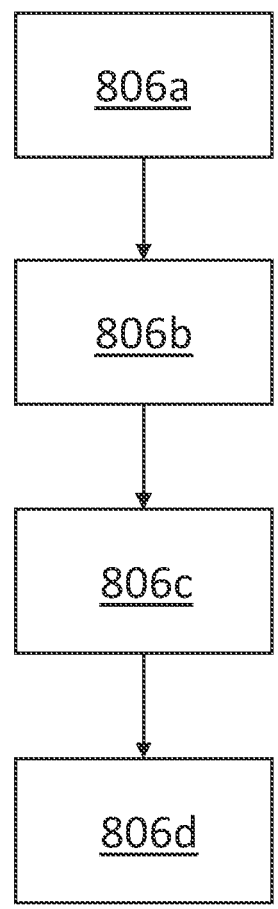

FIG. 6 refers to actions that the system 10 may take to complete step 806 of FIG. 2.

First, at 806a, the system 10 calculates a Euclidean distance between the two coordinates by traversing a centroid coordinate of the point cloud object detection box transformed to the pixel coordinate system and a central coordinate of the image object detection box. The following equation may be used:

$$dis = \sqrt{(x_c - x_l)^2 + (y_c - y_l)^2}$$

where:
$x_c$, $y_c$ each represent the center coordinate of the image object bounding box; and
$x_l$, $y_l$ each represent a centroid coordinate of point cloud data transformed to the pixel coordinate system.

In general, the above calculates the relationship between the center point coordinates of the camera image detection box and the centroid point coordinates of the LiDAR detection box projected by the point cloud to the pixel coordinate system.

In general, the above centroid coordinate is the centroid coordinate of the point cloud data projected to the 2D point cloud under the pixel coordinate system. In some embodiments, because of possible irregularity of the point cloud, the centroid of the point cloud is used to represent the center position of the LiDAR target. The center coordinate is the center coordinate of the 2D detection box of the image.

In some embodiments, the system 10 then compares the absolute value of the Euclidean distance |dis| to a set threshold value ε to provide an initial judgement.

The threshold ε of centroid and center point coordinates refers to the Euclidean distance between the center point coordinates of the camera image detection box and the centroid coordinates of the LiDAR detection box.

For example, if |dis|<ε, then the system 10 may proceed and determine the fusion between the two objects. However, because the center point of the point cloud detection box and the image detection box are used for traversal query, if the Euclidean distance |dis| of the center coordinates of the two points is greater than the set threshold value ε at first judgment, it may be deduced that these two goals are not relevant, and the system 10 may not need to proceed with the fusion, thereby increasing the speed of the overall calculation.

Accordingly, at 806*b*, the system 10 determines if the Euclidean distance |dis| between the centroid coordinate and the center coordinate meets a particular threshold, e.g., if |dis|<ε. If the distance |dis| meets the threshold, the system 10 performs object fusion in step 806*c* below, and if not, the system 10 may not perform object fusion.

In some embodiments, the threshold ε of centroid and center point is 50 pixels. It is understood that other values of ε also may be used.

Depending on the determination in 806*b*, the system 10 determines, at 806*c*, an intersect over union IOU for an area of the image object detection box of the image data in the pixel coordinate system and an area of the point cloud object detection box of the point cloud data in the pixel coordinate system. In other words, the IOU threshold refers to the proportion of the area between the image 2D detection box and the rectangular area projected by the point cloud into the pixel coordinate system. It can be understood here as two overlapping rectangles, with the IOU representing the intersection of two rectangular boxes divided by the union of two rectangular boxes.

The IOU may be calculated using the equation below. This may reduce the associated error for multiple objects had the system 10 only determined the Euclidean distance between centroid coordinates.

$$Iou = 1 - \frac{S_c \cap S_l}{S_c \cup S_l}$$

where:
$S_c$ represents the area of the image object bounding box; and
$S_l$ represents the area of the point cloud object bounding box of the transformed point cloud data.

Next, at 806*d*, the system 10 determines if the IOU exceeds a set threshold, e.g., of 0.7. If so, the system 10 determines a uniform object thereby implementing the decision-level fusion of the image bounding box and the point cloud bounding box to obtain a consistent description of the two sensors on the same object. It is understood that other thresholds for the IOU also may be used.

It is understood that the steps 806*a*-802*d* are shown for demonstration and that other actions also may be taken. It also is understood that not all of the actions described must be taken and that the actions may be performed in different order(s).

Figure 7:
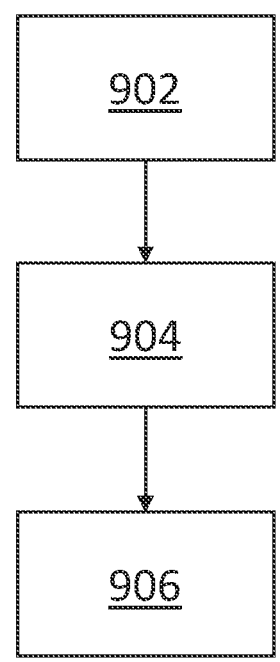

FIG. 7 refers to actions that the system 10 may take to complete step 900 of FIG. 2.

First, at 902, the system 10 the system 10 performs data fusion on the image object detection box and the point cloud object detection box upon the determination of the relationship. The system 10 transforms image information in the image object detection box to a 3D coordinate system through an inverse matrix of the obtained external parameter matrix and a transformation relationship for the internal parameters of the monocular camera 200. This preferably establishes a map data format of <pixel value, point cloud value>.

In some embodiments, to accomplish this, the LiDAR point cloud information may be projected to the image's pixel coordinate system using the external parameter matrix and the camera's internal parameter matrix. In this case, the pixel coordinate system of the image may include both the pixel coordinate values of the image as well as the 2D Li DAR points projected by the radar point cloud. In some embodiments, the data type of the LiDAR is preferably PCL::PointXYZI type. In addition, because the LiDAR data may be sparse, its projection density may not be as dense as the image pixel information. The pixel points and the LiDAR points of the same location are then recorded, preferably showing both the LiDAR data points and the image pixel points at the pixel value of this location thereby forming a pair of points.

Next, through the inverse matrix operation of the camera's internal and external parameter matrices, the position of this point in the LiDAR coordinate system may be calculated, and at the same time, the R, G, B channels of the corresponding location pixel values may be assigned to the point cloud data. In this case, the point cloud data type is preferably PCL::PointXYZIRGB type, and the interpolation of the LiDAR point cloud data channel may be completed.

Given the above, at 904, the system 10 screens a valid key value of each of a pixel value and a point cloud value, thereby implementing matching between corresponding image information and point cloud data.

Then, at 906, the system 10 interpolates RGB image information into the point cloud data, and augments point cloud data having a format of (x, y, z, i, r, g, b), thereby augmenting a channel value of the point cloud data.

It is understood that the steps 902-906 are shown for demonstration and that other actions also may be taken. It also is understood that not all of the actions described must be taken and that the actions may be performed in different order(s).

It is understood that any aspect or element of any embodiment of the system 10 as described herein or otherwise can be combined with any other embodiment of the system 10 to form additional embodiments of the system 10, all of which are in the scope of the system 10.

Computing

The services, mechanisms, operations and acts shown and described above are implemented, at least in part, by software running on one or more computers or computer systems or devices. It should be appreciated that each user device is, or comprises, a computer system.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 8:
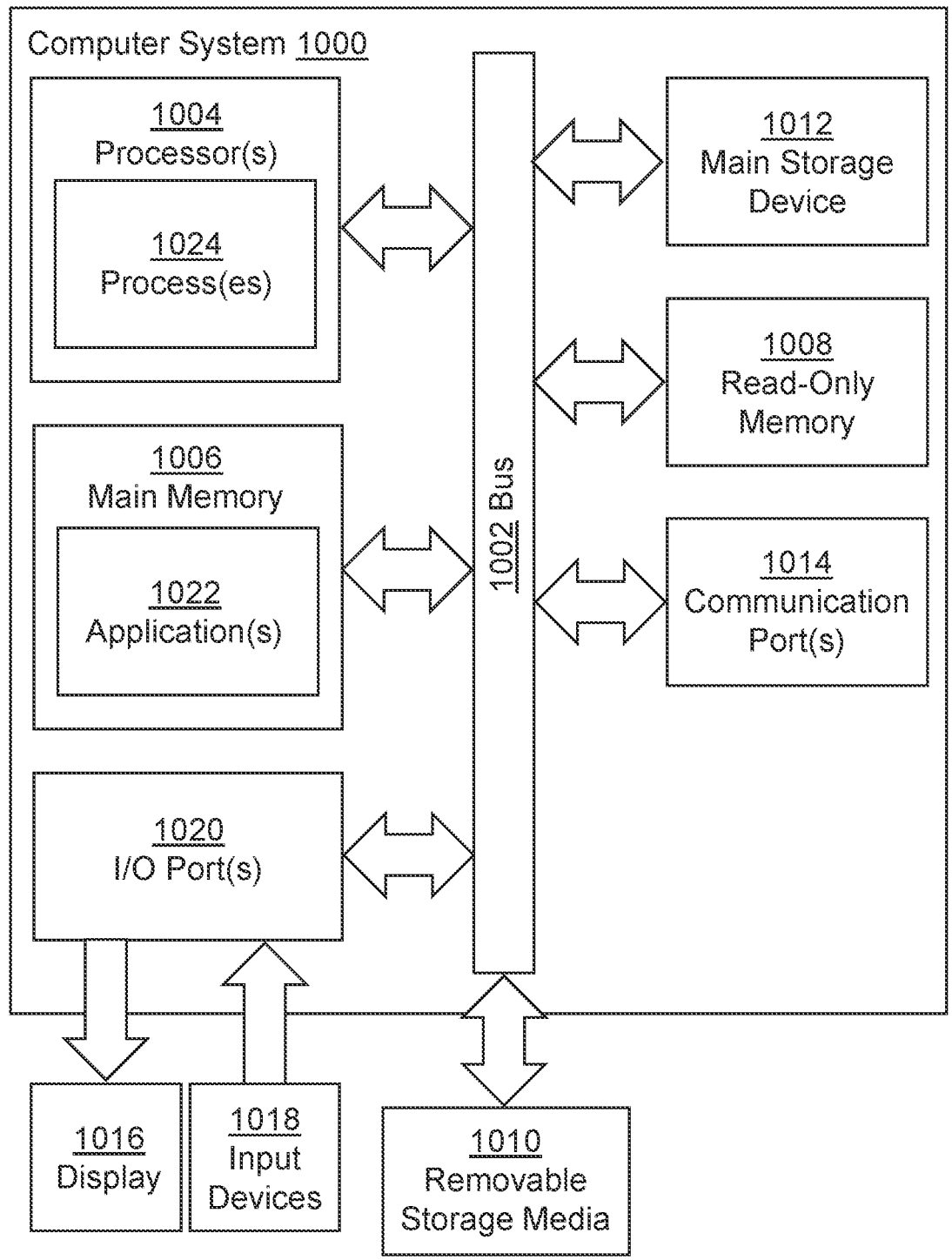
FIG. 8 depicts aspects of computing and computer devices in accordance with exemplary embodiments hereof.

FIG. 8 is a schematic diagram of a computer system 1000 upon which embodiments of the present disclosure may be implemented and carried out.

According to the present example, the computer system 1000 includes a bus 1002 (i.e., interconnect), one or more processors 1004, one or more communications ports 1014, a main memory 1010, removable storage media 1010, read-only memory 1008, and a mass storage 1012. Communication port(s) 1014 may be connected to one or more networks by way of which the computer system 1000 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 1004 can be (or include) any known processor, such as, but not limited to, an Intel® Itanium® or Itanium 2® processor(s), AMD® Opteron® or Athlon MP® processor(s), or Motorola® lines of processors, and the like. Communications port(s) 1014 can be any of an RS-232 port for use with a modem-based dial-up connection, a 10/100 Ethernet port, a Gigabit port using copper or fiber, or a USB port, and the like. Communications port(s) 1014 may be chosen depending on a network such as a Local Area Network (LAN), a Wide Area Network (WAN), a CDN, or any network to which the computer system 1000 connects. The computer system 1000 may be in communication with peripheral devices (e.g., display screen 1010, input device(s) 1018) via Input/Output (I/O) port 1020. Some or all of the peripheral devices may be integrated into the computer system 1000, and the input device(s) 1018 may be integrated into the display screen 1010 (e.g., in the case of a touch screen).

Main memory 1010 can be Random Access Memory (RAM), or any other dynamic storage device(s) commonly known in the art. Read-only memory 1008 can be any static storage device(s) such as Programmable Read-Only Memory (PROM) chips for storing static information such as instructions for processor(s) 1004. Mass storage 1012 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 1002 communicatively couples processor(s) 1004 with the other memory, storage and communications blocks. Bus 1002 can be a PCI/PCI-X, SCSI, a Universal Serial Bus (USB) based system bus (or other) depending on the storage devices used, and the like. Removable storage media 1010 can be any kind of external hard-drives, floppy drives, IOMEGA® Zip Drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor, or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 1010 is encoded with application(s) 1022 that support(s) the functionality as discussed herein (an application 1022 may be an application that provides some or all of the functionality of one or more of the mechanisms described herein). Application(s) 1022 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 1004 accesses main memory 1010 via the use of bus 1002 in order to launch, run, execute, interpret or otherwise perform the logic instructions of the application(s) 1022. Execution of application(s) 1022 produces processing functionality of the service(s) or mechanism(s) related to the application(s). In other words, the process(es) 1024 represents one or more portions of the application(s) 1022 performing within or upon the processor(s) 1004 in the computer system 1000.

It should be noted that, in addition to the process(es) 1024 that carries(carry) out operations as discussed herein, other embodiments herein include the application 1022 itself (i.e., the un-executed or non-performing logic instructions and/or data). The application 1022 may be stored on a computer readable medium (e.g., a repository) such as a disk or in an optical medium. According to other embodiments, the application 1022 can also be stored in a memory type system such as in firmware, read only memory (ROM), or, as in this example, as executable code within the main memory 1010 (e.g., within Random Access Memory or RAM). For example, application 1022 may also be stored in removable storage media 1010, read-only memory 1008, and/or mass storage device 1012.

Those skilled in the art will understand that the computer system 1000 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

As used in this description, the term "portion" means some or all. So, for example, "A portion of X" may include some of "X" or all of "X". In the context of a conversation, the term "portion" means some or all of the conversation.

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of XYZs" may include one or more "XYZs".

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram the activities associated with those boxes may be performed in any order, including fully or partially in parallel.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method for multi-sensor objection detection using point cloud projection, comprising the following steps:
   (A) using a calibration target, calibrating first internal parameters of a camera;
   (B) using the calibrated first internal parameters from (A), performing joint calibration of the camera and a light detection and ranging system (LiDAR), and outputting a calibrated external parameter matrix;
   (C) using the LiDAR to acquire first point cloud data of a first object, and using the camera to acquire first image data of the first object, wherein the first point cloud data and the first image data are taken from the same angle of view of the first object;
   (D) classifying the first point cloud data and the first image data from (C);
   (E) using the first point cloud data and the classification from (D) to determine a first three-dimensional (3D) object bounding box;
   (F) using the first image data and the classification from (D) to determine a first two-dimensional (2D) object bounding box;
   (G) transforming a coordinate system using the calibrated external parameter matrix from (B), and using the transformed coordinate system, mapping the first 3D object bounding box to the first 2D object bounding box;
   (H) performing decision-level fusion on the first object;
   (I) using the mapping result from (G), performing pixel-level fusion on the first 3D object bounding box and the first 2D object bounding box.

2. The method of claim 1, further comprising:
   (E)(1) cropping out invalid point cloud data from the first point cloud data according to an angle of view of the camera;
   (E)(3) using a pseudo-scan line filter algorithm, filtering noise from the first point cloud data leaving only non-ground point data in the first point cloud data;
   (E)(4) downsampling the first point cloud data;
   (E)(5) gridding the first point cloud data through a voxel grid filter;
   (E)(6) segmenting the first point cloud data at a non-ground point;
   (E)(7) clustering the first point cloud data using an adaptive threshold Euclidean clustering algorithm; and
   (E)(8) determining a corresponding first 3D object bounding box of the first object.

3. The method of claim 1, further comprising:
- (G)(1) projecting, according to the external parameter matrix of (B), the first 3D object bounding box to a pixel coordinate system in which the first 2D bounding box is located;
- (G)(2) acquiring, in the pixel coordinate system, corresponding corner coordinates and a corresponding central coordinate of the first 2D object bounding box output of (F);
- (G)(3) calculating a corresponding transformation relationship between a point cloud coordinate at which the first 3D object bounding box is projected to the pixel coordinate system and an image coordinate of the first 2D object bounding box in the pixel coordinate system; and
- (G)(4) associating a transformed point cloud object bounding box to the image object bounding box using a discriminant method.

4. The method of claim 3, further comprising:
- (G)(1)(1) calculating a maximum value and a minimum value of the first point cloud data in the first 3D object bounding box;
- (G)(1)(2) calculating a centroid coordinate of the first point cloud data in the first 3D object bounding box;
- (G)(1)(3) calculating a scale of a corresponding X-axis, Y-axis and Z-axis for the first point cloud data in the first 3D object bounding box, determining a boundary of the first point cloud data in the corresponding X-axis, Y-axis, and Z-axis, and calculating, according to the centroid coordinate of the first point cloud data and the scale of each of the corresponding X-axis, Y-axis, and Z-axis, a start coordinate and an end coordinate of the first point cloud data in a first 3D object detection box on each of the corresponding X-axis, Y-axis, and Z-axis;
- (G)(1)(4) aligning time between the first point cloud data and the first image data;
- (G)(1)(5) transforming, through the external parameter matrix of (B), a point cloud coordinate system for first point cloud data determined at the boundary in each of the X-axis, Y-axis, and Z-axis by transforming a point cloud data coordinate from a LiDAR coordinate system to a camera coordinate system, and transforming a point cloud data coordinate in the 3D object detection box to a 2D pixel coordinate in the pixel coordinate system using the internal parameter information of the camera from (A).

5. The method of claim 3, further comprising:
- (G)(4)(1) calculating, a Euclidean distance between a centroid coordinate of the point cloud object bounding box and a central coordinate of the image object bounding box;
- (G)(4)(2) determining if the Euclidean distance meets a first threshold;
- (G)(4)(3) in response to a determination that the Euclidean distance meets the first threshold, determining an intersection of union for an area of the image object bounding box of the first image data in the pixel coordinate system and an area of the point cloud object bounding box of the first point cloud data in the pixel coordinate system;
- (G)(4)(4) determining if the intersection of union exceeds a second threshold;
- (G)(4)(5) in response to a determination that the intersection of union exceeds the second threshold, continuing to (H).

6. The method of claim 1, further comprising:
- (I)(1) transforming image information in the first image object bounding box to a 3D coordinate system.

* * * * *